Oct. 7, 1924.

N. M. FRAZIER

PIPE COUPLING

Filed April 11, 1922

Inventor
N. M. Frazier
By C. A. Snow & Co.
Attorneys.

Patented Oct. 7, 1924.

1,510,838

UNITED STATES PATENT OFFICE.

NELSON M. FRAZIER, OF HOULTON, OREGON.

PIPE COUPLING.

Application filed April 11, 1922. Serial No. 551,566.

*To all whom it may concern:*

Be it known that I, NELSON M. FRAZIER, a citizen of the United States, residing at Houlton, in the county of Columbia and State of Oregon, have invented a new and useful Pipe Coupling, of which the following is a specification.

This invention relates to pipe couplings and the object thereof is to provide a pipe coupling having no bolts or threads and which can be applied and dismantled without the use of a wrench.

Another object is to provide a coupling composed of sections having a wedging connection whereby the pipe ends to be united may be securely joined without threads or bolts.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
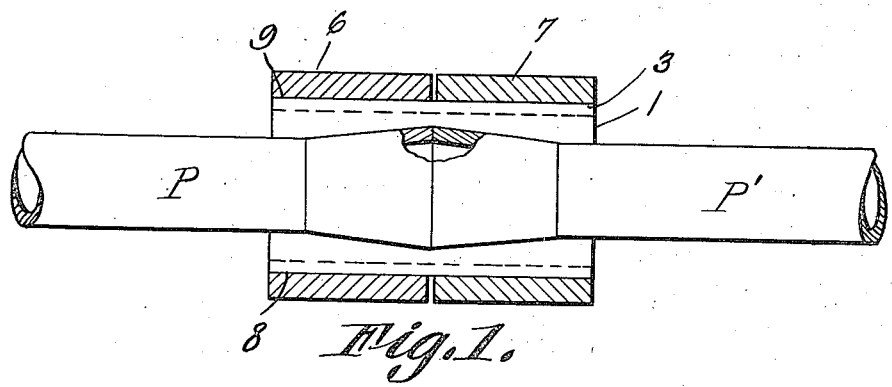
Figure 1 represents a side elevation of two pipe ends shown connected by this improved coupling, the outer members or sleeves of which are shown in section.
Figure 2:
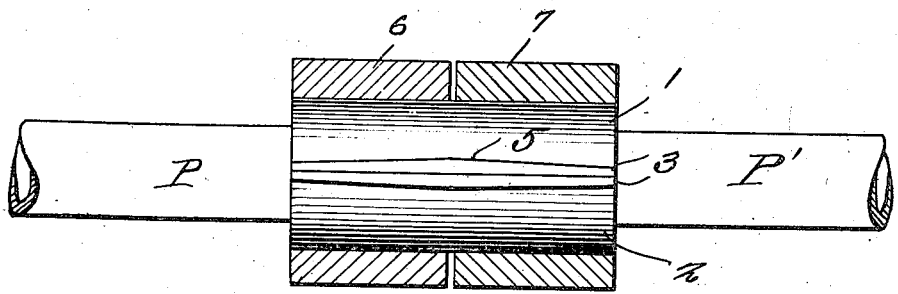
Fig. 2 is a view similar to Figure 1 taken in a plane at right angles thereto.
Figure 3:
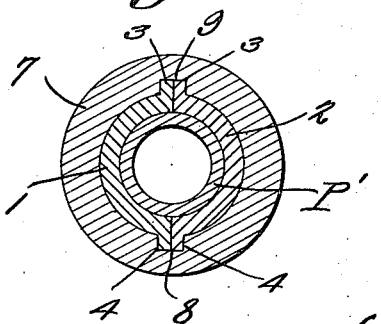
Fig. 3 is a transverse section through the coupling and one of the pipes connected thereby.
Figure 4:
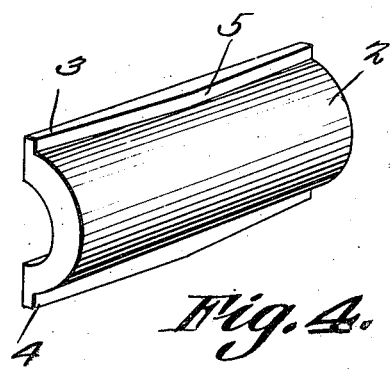
Fig. 4 is a detail perspective view of one of the inner or casing members.
Figure 5:
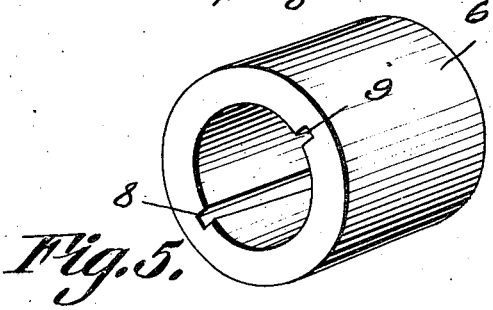
Fig. 5 is a similar view of one of the outer members or sleeves.

In the embodiment illustrated the coupling constituting this invention comprises two clamping or casing members 1 and 2 which may be of any desired length and are semi-circular in cross section adapted when united to form a cylinder to snugly fit the ends of the pipes P and P' to be connected. These casing members 1 and 2 are provided along their side edges with outturned flanges 3 and 4, the meeting faces of the flanges being smooth and straight and adapted to snugly contact with each other when the coupling is applied. The outer faces of the flanges are as shown clearly in Fig. 4 tapered from the centers thereof toward their ends.

A pair of coupling sleeves or cuffs 6 and 7 are designed to be engaged with the clamping members 1 and 2 being insertible on opposite ends thereof each of which is provided on its inner face with diametrically opposite longitudinally extending grooves 8 and 9 which taper from the inner toward the outer ends of the sleeve and are designed to straddle the flanges of the two members 1 and 2 when applied and have a wedging engagement therewith so that when these sleeves are forced inwardly toward each other on the members 1 and 2 they will operate to clampingly connect the members with each other and with the pipe ends as well as to wedgingly connect the sleeves with the members 1 and 2.

From the above description, it will be obvious that this improved coupling may be assembled without the use of any tools other than a hammer for driving the sleeves 6 and 7 into wedging engagement with the members 1 and 2 and that they may be readily separated and removed by forcing an implement between their inner ends and moving them outwardly.

This coupling may be used either with or without a packing, none being here shown since obviously it may be used if desired or found necessary to do so, the joint however, being fluid tight without such packing.

I claim:—

1. A pipe coupling comprising a pair of semi-tubular pipe clamping members having outturned flanges along their side edges adapted to fit snugly in contact with each other when assembled, the outer faces of said flanges tapering toward one end, and a sleeve slidable over said members and having a tapered groove straddling said flanges and having a wedging connection therewith throughout the length of the sleeve.

2. A pipe coupling comprising a pair of semi-tubular pipe clamping sections having outturned flanges along their side edges, the outer faces of which taper toward their ends, and a pair of sleeves slidable over the ends of said sections and each having diametrically opposite longitudinally extending grooves on their inner faces to receive the meeting flanges of the sections, said grooves tapering toward one end of the sleeve whereby a wedging connection is formed between the sections and the sleeves.

In testimony that I claim the foregoing as my own, I have hereto affixed my signature in the presence of two witnesses.

NELSON M. FRAZIER.

Witnesses:
GLEN W. WILLIAMS,
EMMETT WILLIAMS.